United States Patent [19]
Carroll et al.

[11] 4,243,879
[45] Jan. 6, 1981

[54] TOUCH PANEL WITH AMBIENT LIGHT SAMPLING

[75] Inventors: Arthur B. Carroll, St. Joseph; Vladeta D. Lazarevich, Bondville; Mark R. Gardner, Champaign, all of Ill.

[73] Assignee: Carroll Manufacturing Corporation, Champaign, Ill.

[21] Appl. No.: 899,258

[22] Filed: Apr. 24, 1978

[51] Int. Cl.³ .............................................. G01V 9/04
[52] U.S. Cl. .................................. 250/221; 250/214 B
[58] Field of Search ............................... 356/213, 221; 250/214 C, 214 B, 221, 222

[56] References Cited
U.S. PATENT DOCUMENTS

| 3,764,813 | 10/1973 | Clement et al. | 250/221 |
| 3,970,846 | 7/1976 | Schofield | 250/221 |
| 4,061,925 | 12/1977 | van der Gaag | 250/214 B |
| 4,063,085 | 12/1977 | Montanvert | 250/221 |

Primary Examiner—David C. Nelms
Attorney, Agent, or Firm—Hill, Van Santen, Steadman, Chiara & Simpson

[57] ABSTRACT

A dynamic level shifter for photoelectric touch panels incorporating a plurality of photoelectric transducers periodically senses the ambient light level, immediately before the interval when each transducer can receive a pulse of radiant energy during normal operation of the panel. The output of the phototransducer during the such interval is compared with the output during the previous ambient interval, to develop a signal indicative of the presence or absence of the pulse, irrespective of ambient light fluctuations.

22 Claims, 13 Drawing Figures

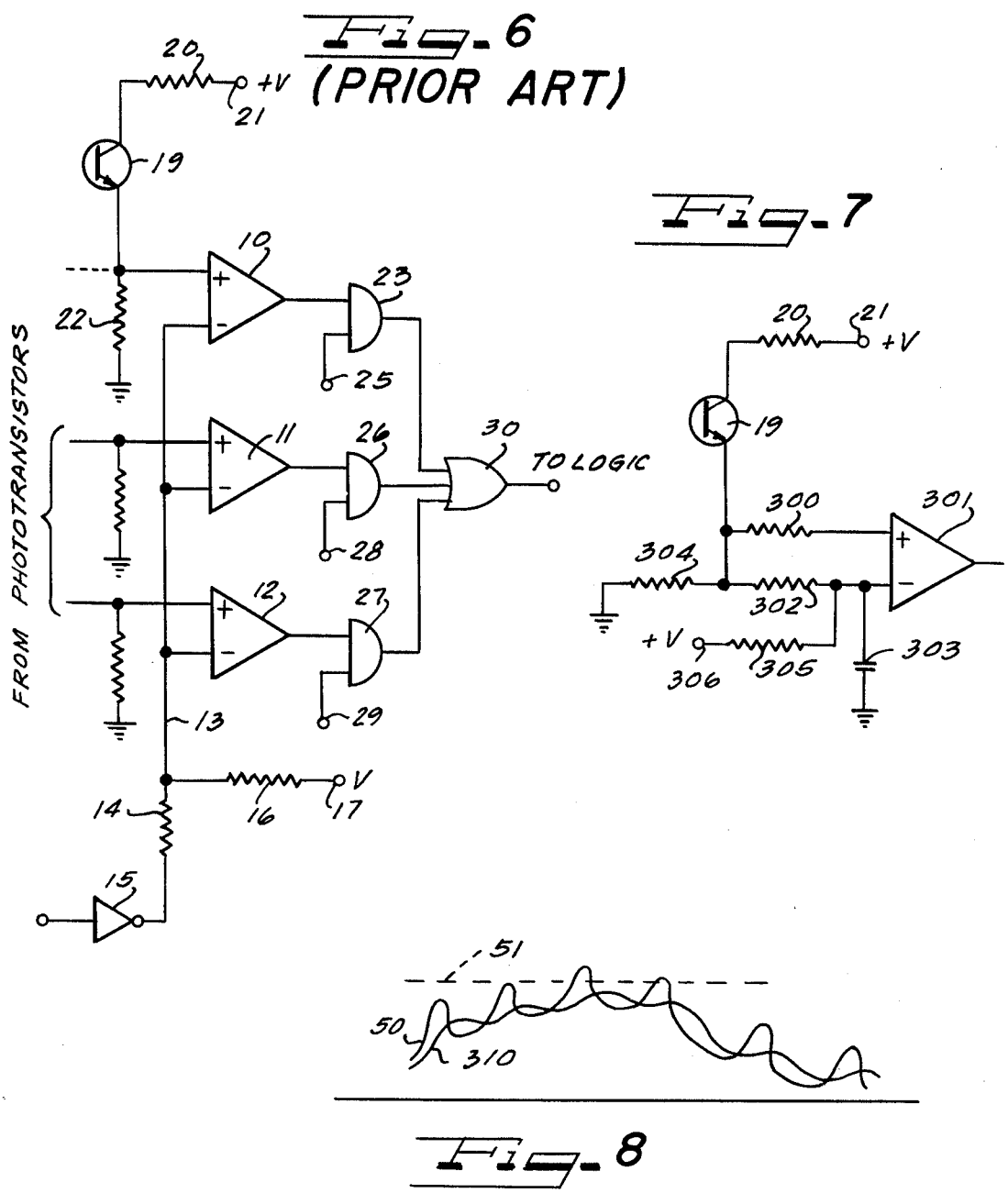

TOUCH PANEL WITH AMBIENT LIGHT SAMPLING

BACKGROUND

The Prior Art

Touch input devices are devices of the type having a relatively flat screen or plate, the space in front of which is traversed by a plurality of beams of radiant energy. The beams are generally arranged to define a plane parallel to the surface of the plate. When a point on the plate is touched with a finger or stylus, light beams are interrupted, and signals indicating which light beams have been interrupted are used to develop signals corresponding to the X and Y coordinates of the point on the plate which has been touched. Typically, infrared sources such as LED's or the like are employed to produce the light beams, and phototransistors or other IR detectors are employed to detect the light beams, with the LED's mounted along one edge of the panel, and the phototransistors mounted along the opposite edge, in line with the beams produced by the LED's. Since touch panels are typically used in lighted rooms, having relatively high ambient light level conditions, the phototransistors are subject to variations in the ambient light level, and their outputs depend not only on the light energy emitted from their respective LED's, but also on the ambient light conditions. Typically, a threshold level must be selected for the phototransistors, to enable them to detect the radiant energy produced by their associated LED's, and not any ambient light conditions. Any fixed threshold level is necessarily a compromise, which degrades the performance of the apparatus, and may also render the apparatus unusable if the ambient lighting conditions are changed markedly.

BRIEF SUMMARY OF THE INVENTION

It is a principal object of the present invention to provide a threshold circuit which is less sensitive to variations in ambient lighting levels, to allow superior performance under a variety of different lighting conditions.

This and other objects and advantages of the present invention will become manifest upon an examination of the following description and accompanying drawings.

In one embodiment of the present invention there is provided an analog multiplexer connected with outputs of a plurality of phototransistors, and adapted to connect the output of one of said phototransistors to an output terminal, a sample-and-hold unit connected to said output terminal and adapted to sample and hold the output level of said multiplexer during a first time interval, a comparator, analog switch means for connecting said output terminal to said comparator during a second time interval, and means for connecting said sample-and-hold unit to said comparator during said second time interval, said comparator being operative to manifest a signal in response to a comparison.

BRIEF DESCRIPTION OF THE DRAWINGS

Reference will now be made to the accompanying drawings in which:

FIG. 6 is an illustration of a prior art arrangement;

FIG. 7 is a schematic diagram of an alternative embodiment of the present invention;

FIG. 8 is a graph illustrating certain aspects of the operation of the apparatus of FIGS. 6 and 7;

FIG. 9 is a graph indicating the operation of the circuit of FIG. 7;

Figure 1:
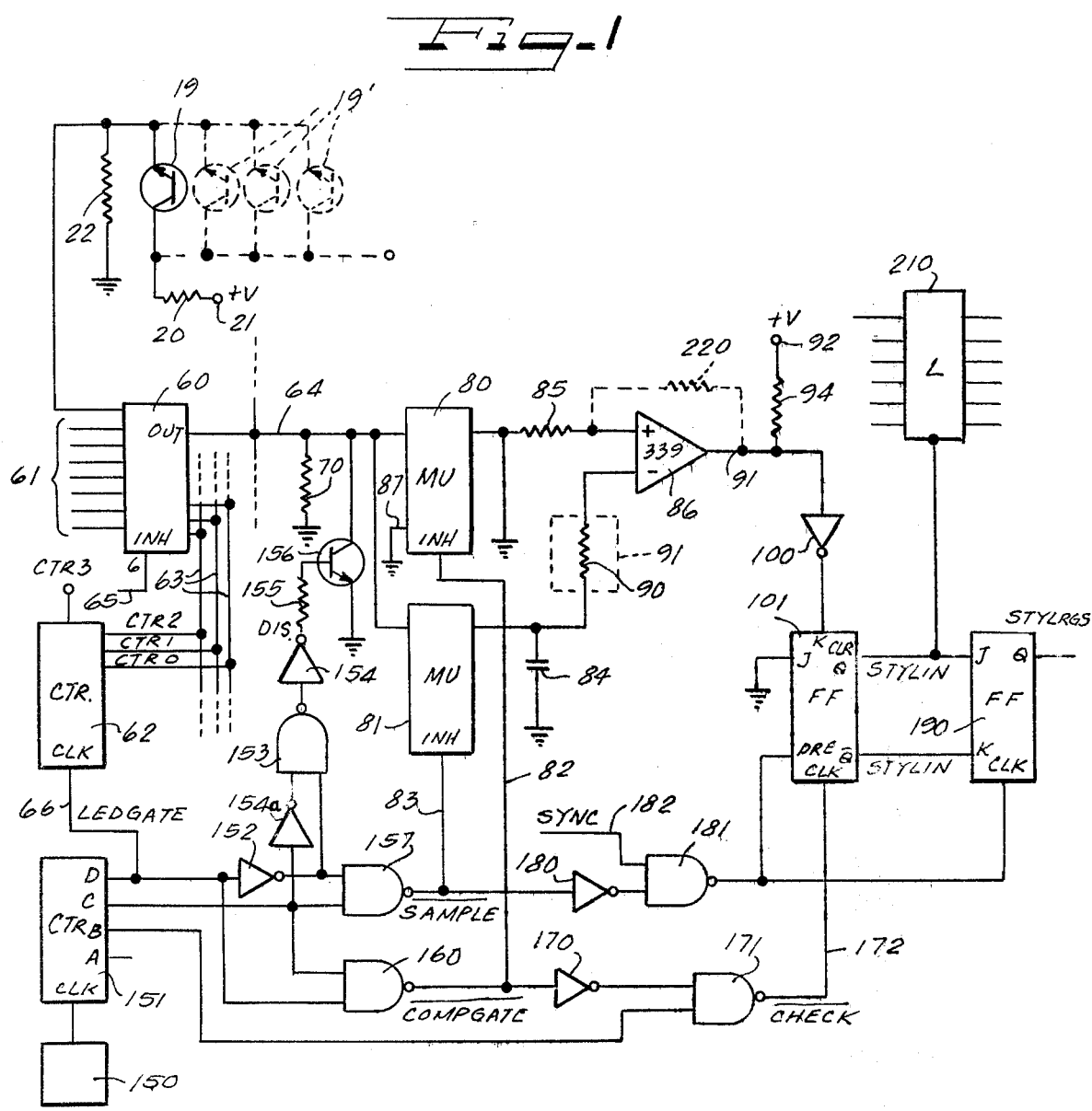
FIG. 1 is a functional block diagram, partly in schematic diagram form, of an illustrative embodiment of the present invention.

Referring first to FIG. 6, which is a circuit diagram of an arrangement which has heretofore been used in connection with touch input panels, a plurality of comparators 10, 11 and 12 are provided, each of which has one terminal connected in common to a line 13. The voltage on the line 13 establishes the fixed threshold for all of comparators 10, 11 and 12.

The line 13 is connected through a resistor 14 to the output of an inverter 15, and through a resistor 16 to a source of positive potential at a terminal 17. The inverter 15 is of one of the conventional saturated logic families, so that the potential at its output is one of two fixed voltage levels. One level is near the level of the potential applied to the terminal 17, and the other level is near ground. Accordingly, the potential on the line 13 is one of two fixed values, in accordance with the state of the inverter 15, as determined by the resistors 14 and 16. The fixed threshold value of the comparators 10, 11 and 12 corresponds to one of the two levels on the line 13, with the other level constituting a turn-off or inhibit signal.

The second input of the comparator 10 is connected by a line 18 to one terminal of a phototransistor 19, the other terminal of which is connected to a resistor 20 to a source of positive potential at a terminal 21. The line 18 is also connected to ground by a resistor 22. The output of the comparator 10 is high only when the phototransistor 19 is conductive. The output of the comparator is connected to an AND-gate 23, which is enabled at an appropriate time by signal applied to a terminal 25. The comparators 11 and 12 are similarly connected with AND-gates 26 and 27, each of which is triggered at appropriate times by signals applied to terminals 28 and 29. The outputs of the three AND-gates 23, 26 and 27 are all applied to separate inputs of an OR-gate 30, so that the output of the OR-gate 30 contains the composite signals produced by the comparators 10, 11 and 12. Although not illustrated, a plurality of phototransistors may be connected to the noninverting inputs of the comparators 10, 11 and 12, in which case each comparator is operated when any one of the phototransistors connected to it becomes conductive.

In operation, beamed pulses of radiant energy are normally received by the phototransistors such as the phototransistor 19 periodically, by the successive energization of a plurality of LED's or other light sources. A cycle of operation in which each LED is energized once is called a scan cycle. Pulses produced by the phototransistors are passed by the comparators 10-12 to the AND-gates 23, 26 and 27. Timing signals are also applied to the AND-gates 23, 26 and 27 at appropriate times so that the output of the OR-gate 30 normally contains a continuous train of pulses. When a light beam is interrupted, a pulse is missing from the pulse train at the output of the OR-gate 30, and this fact is used to establish a coordinate of the interrupted light beam.

When the apparatus of FIG. 6 is operated under conditions of changing ambient light level, its operation is dependent on the ambient light conditions. This is illustrated in FIG. 8, where the curve 50 illustrates an ambient or base light level which varies, with beamed pulses superimposed on it. It can be seen that when the ambient variation is extreme, as shown in FIG. 8, there is no threshold level which can discriminate all of the beamed pulses individually. A high threshold level, such as the dashed line 51, cannot detect some pulses which are concurrent with low ambient light, while a lower threshold level is unable to distinguish pulses concurrent with high ambient light. Accordingly, the apparatus of FIG. 6 must be restricted to operation under conditions in which the variation and the light level is less extreme than that illustrated in FIG. 8.

The apparatus in FIG. 1, which forms an exemplary embodiment of the present invention, is constructed so as to be insensitive to variations in ambient light level which are even more extreme than the variation illustrated in FIG. 8. An analog multiplexer 60 has a plurality of inputs 61, each of which is connected to the emitter of a phototransistor such as 19. A binary counter 62 has outputs from its several stages connected to the select inputs of the multiplexer 60 over lines 63, so that one of the several inputs 61 is selected for connection to an output line 64, in accordance with the signals on the select lines 63. In example illustrated in FIG. 1, the multiplexer 60 has eight inputs, so that three binary coded lines 63 are sufficient for selecting one of the eight inputs for connection to the line 64. In addition, an inhibit line 65 inhibits operation of the multiplexer 60 when it is desired to have none of the eight input lines 61 connected to the output line 64. A resistor 70 functions as a load resistor for the line 64.

Additional multiplexers (not shown) like the multiplexer 60, may be provided for connecting other phototransistors, one at a time, to the line 64, with a specific multiplexer selected by proper energization of its inhibit line 65, and with a specific phototransistor being selected by the select lines 63 which would be connected in common to the select inputs of all of the multiplexers. The counter 62 is clocked by a signal on a line 66, which signal is synchronized with selection of the LED's, so that outputs of the phototransistors, such as the phototransistor 19, are selected at the proper time for operation during the intervals when their respective light sources are energized.

The line 64 is connected to the inputs of two analog switches 80 and 81, both of which are activated at appropriate times by signals on lines 82 and 83 respectively. The analog switch 81 is activated at a first time, corresponding to a time after one of the lines 61 has been connected by the multiplexer 60 to the line 64, and just before the expected time of arrival of the pulse of radiant energy at a phototransistor connected to such line 61. A capacitor 84 is connected between the output of the switch 81 and ground, and is charged to a level corresponding to the voltage level then on the line 64, each time the analog switch 81 is activated. The switch 81 and the capacitor 84 function as a sample-and-hold unit, to sample the level on the line 64 and hold that level at the ungrounded terminal of the capacitor 84. Subsequently, the switch 80 is activated, and the level on the line 64 is connected by a resistor 85 to the noninverting input of a comparator 86. A resistor 200 is connected between the output of the comparator 86 and its noninverting input to establish a small hysteresis in its operation. At times when the analog switch 80 is not activated, its output is connected to a grounded second input 87. At times when the analog switch 81 is not activated, its output is connected to an unused input, and is therefore left floating.

The ungrounded terminal of the capacitor 84 is connected to the inverting input of the comparator 86 through a resistor 90, and the comparator 86 produces an output on a line 91 in accordance with the relative level of the signals on its two inputs. The line 91 is connected to a source of positive voltage at the terminal 82, by a pull-up resistor 94, so that its level is normally high except when the level on the inverting input of the comparator 86 exceeds a level on the non-inverting input. The line 91 is connected through an inverter 100 to the K input of a JK flip-flop 101, the function of which is to serve as a detector of missing pulses on the line 91.

The apparatus for controlling operation of the apparatus of FIG. 1 will now be described. A source of clock signals is produced by an oscillator 150, which signals are applied to the input of a four-stage binary counter 151. The four outputs of the binary counter, available on separate output lines A, B, C, D, which have pulse rates which differ from each other by powers of 2. The waveforms of these outputs appear in FIG. 2. The D output line is connected to the line 66, to furnish the clock pulses for the counter 62 which has already been described.

Figure 2:
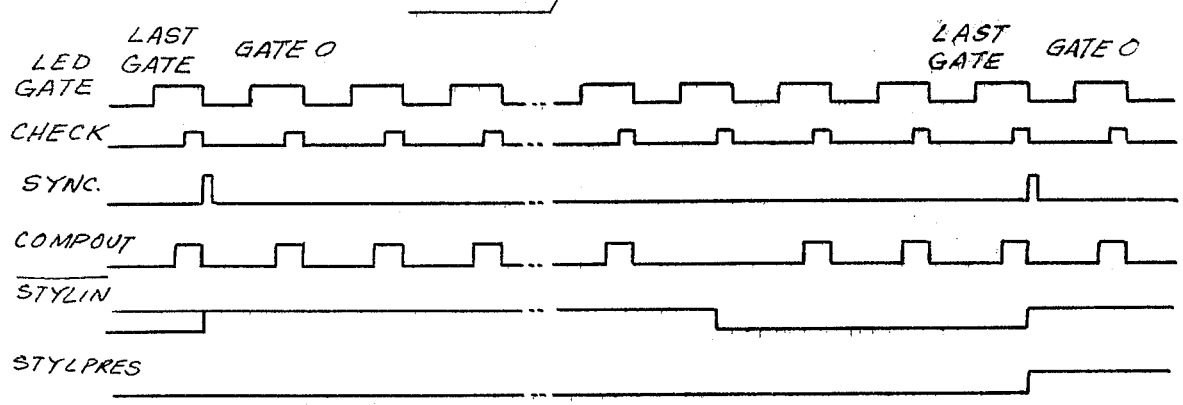
FIGS. 2–5 are illustrations of waveforms which are produced in the course of operation of the apparatus of FIG. 1.
Figure 3:
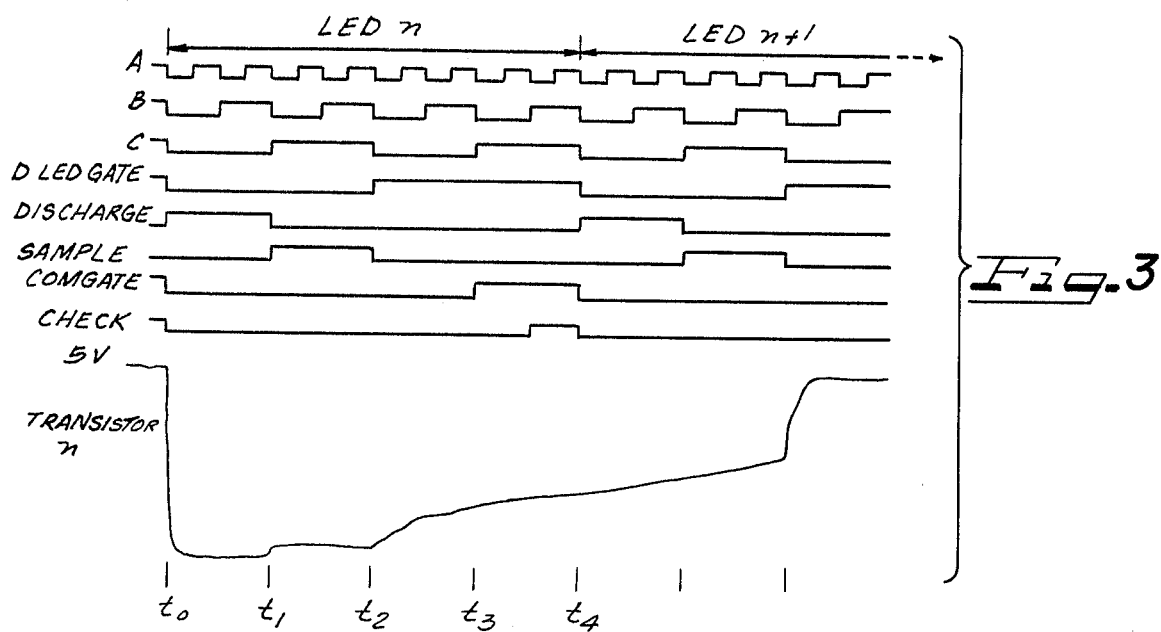
Figure 4:
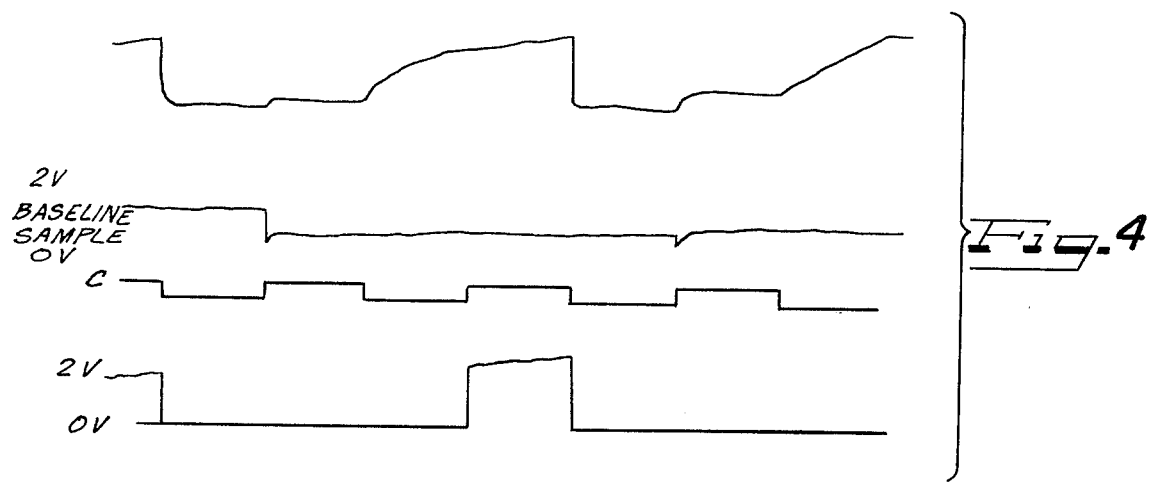
Figure 5:
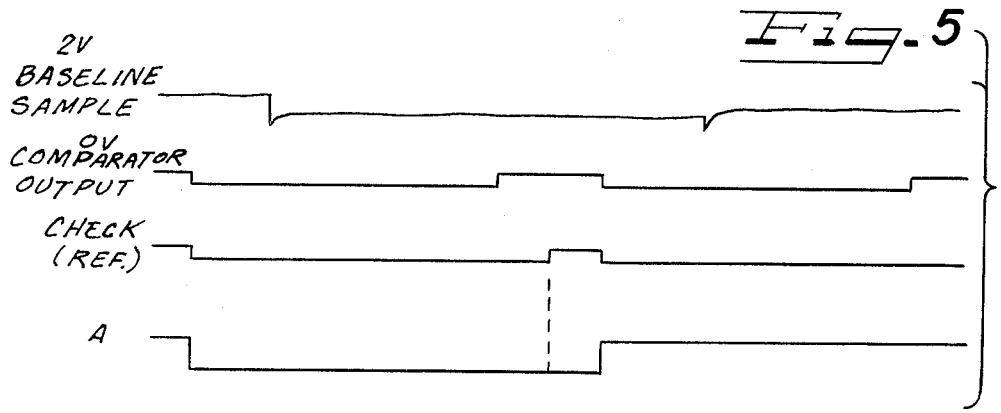

The D output line is also connected to the input of an inverter 152, the output of which is connected to one input of a NAND-gate 153. The C output line is connected to an input of an inverter 154, the output of which is connected to the other input of the NAND-gate 153. The output of the NAND-gate 153 is passed through an inverter 154a and a resistor 155 to the base of an npn transistor 156, the collector of which is connected to the line 64. Its emitter is connected to ground. The output of the inverter 154 is referred to as the discharge signal and its waveform is shown in FIG. 2. The output of the inverter 152 and the C output line are also connected to two inputs of an NAND-gate 157, the output of which will be referred to as a sample signal, the inverse of which is shown in FIG. 3. It is connected to the line 83 and controls operation of the analog switch 81.

The C and D output lines are also both connected to two inputs of an NAND-gate 160, the output of which is referred to as a comgate signal, the inverse of which is shown in FIG. 3. It is connected to the line 82 and controls operation of the analog switch 80.

The output of the gate 160 is also connected to the input of an inverter 170, the output of which is connected to one input of the NAND-gate 71. The other input of the NAND-gate 171 is connected to the B output line. The gate 171 produces a signal on a line 172 which will be referred to as the check signal. The inverse of this signal is also shown in FIG. 3.

The line 172 is connected to the clock input of a JK flip-flop 101, to cause the flip-flop 101 to be reset at the time of the check pulse if there is at that time a low level output from the comparator 86. If the output from the comparator 86 is high, the state of the flip-flop 101 is not changed at check pulse time.

The output of the NAND-gate 157 is connected to the input of an inverter 180, the output of which is connected to one input of an NAND-gate 181. The other input of the NAND-gate 181 is supplied by a line 182, which is energized (by means not shown) at the beginning of each scan cycle, that is, of operation. The output of the NAND-gate 181 is connected to a preset input of the flip-flop 101, and to a clock input of a JK flip-flop 190. The J and K inputs of the flip-flop 190 are connected respectively to the $\overline{Q}$ and Q outputs of the flip-flop 101. The function of the signal generated by the gate 181 is to preset the state of the flip-flop 101 at the beginning of each cycle, and to simultaneously transfer data previously stored in the flip-flop 101 to the flip-flop 190.

The timing of events occurring during a typical cycle of operation will be described in relation to the curve 200 (FIG. 3) which illustrates the voltage level present at the emitter of a given phototransistor 19. This phototransistor, referred to as "transistor n" in FIG. 3, is selected at time $t_0$, just after the beginning of the time period illustrated by the graphs in FIG. 3, and extends for one cycle of the D output signal, as shown. As it is selected, by appropriate voltage levels on the select lines 63, its output level drops from near the supply voltage to near ground, since it is at that time being discharged through the transistor 156, which is conductive during the first quarter of the select interval, i.e., the period during the scan cycle at which an LED is energized to activate the phototransistor n. The purpose of this operation is to establish an initial condition in which the voltage level at the emitter of the phototransistor 19 is at a reference value near ground.

During the second quarter of the select interval, beginning at time $t_1$, the transistor 156 is cut off and the analog switch 81 is energized by the $\overline{sample}$ signal, so that the capacitor 84 is then connected across the output of the phototransistor 19, along with the load resistor 70. Since at this time no LED is energized, the phototransistor 19 sees only ambient illumination, so its output corresponds to the ambient light level. The time constant of the circuit including the capacitor 84 is sufficiently short so that the capacitor 84 is fully charged to a level corresponding to the ambient light level by the end of the second quarter of the select interval. The analog switch 81 is deenergized at the end of the second quarter of the select interval, and the capacitor 84 continues to hold the same charge through the rest of the select interval.

During the second half of the select interval, beginning at time $t_2$, the LED n is energized, and its illumination is detected by the phototransistor 19. As shown in FIG. 3, the output voltage of the phototransistor 19 rises dramatically beginning with the excitation of the LED, corresponding to the combined reaction time of the LED and the photo-transistor. By the end of the third quarter of the select interval, at time $t_3$, the level on the line 64 is substantially above the ambient level, sampled during the second quarter. The level continues to rise, due to the time constant of the circuit.

During the fourth quarter of the select interval, beginning at time $t_3$, the $\overline{comgate}$ signal energizes the analog switch 80. When the switch 80 is energized, the output of the phototransistor 19 is connected through the resistor 85 to the noninverting input of the comparator 86, and its load is increased by the resistor 87. The inverting input of the comparator 86 is connected to the ungrounded terminal of the capacitor 84, which was charged during the second quarter of the select interval to a level corresponding to the ambient light condition. If the light level sensed by the phototransistor during the fourth quarter of the select interval exceeds the ambient level sensed during the second quarter of the period, the output of the comparator 86 is high. If approximately the same ambient light level persists during the third and fourth quarters, the output of the comparator 86 remains low.

The $\overline{check}$ pulse appears during the last ⅛th of the select interval, and is applied to the clock input of the flip-flop 101. As the J input of the flip-flop 101 is connected to ground, there is no change in the state of the flip-flop, as long as the output of the comparator 86 is high, so that the output of the inverter 100 is low. This occurs each time a pulse is sensed by the transistor 19. If the pulse should be absent because the lightbeam is interrupted, the output of the inverter 100 is high at this time, causing the state of the flip-flop 101 to be changed. Subsequent pulses on the line 91 do not function to again change the state of the flip-flop 101. At the end of the select interval, the state of the flip-flop 101 is transferred to the flip-flop 190, which manifests a signal during the remainder of the scan cycle indicating whether or not a missing pulse has been detected during any select interval of that cycle of operation. The Q output of the flip-flop 101 is also connected to the trigger input of a latch unit 210, the inputs of which are connected to the outputs of the counter 151, so that a digital designation of the light beam which is interrupted can be stored in the latch unit 210.

FIG. 2 illustrates the operation of the apparatus of FIG. 1 on a cycle-by-cycle basis. The signal on the D output line is illustrated, which causes selection of one LED after another, with a check pulse appearing during the last ⅛th of each D cycle. The synchronizing pulses on the line 182, which appear at the beginning of each cycle of operation, are illustrated, and the output of the comparator 86 is also illustrated, overlapping the check pulse.

The stylin signal and its inverse are produced at the Q and $\overline{Q}$ outputs of the flip-flop 101. The stylin signal is low until an interrupted beam is detected. Then it is high until the next sync pulse on the line 182, which sets the flip-flop 101 at the beginning of the next cycle. The sync pulse also triggers the flip-flop 190, so that its Q output indicated in FIG. 2 as stylpres, indicates the a stylus is present on the touch panel, since a beam has been interrupted.

Referring again to FIG. 8, will be appreciated that the modulated signal illustrated by line 50 does not present a problem in the operation of the apparatus of FIG. 1. Since in the apparatus of FIG. 1 the ambient light level is sampled immediately before each pulse occurs, and the height of the pulse is sampled and compared with the previously sensed level, the varying ambient level does not mask the beamed pulses. With the apparatus of FIG. 1, there is no fixed reference line such as line 51 in FIG. 8, but the reference voltage, against which each pulse is compared, is derived from the immediately preceding portion of the waveform.

It will be appreciated that the construction of the apparatus illustrated in FIG. 1 is relatively simple and easy to assemble and maintain, so that it represents an economical way to achieve superior performance.

Figure 10:
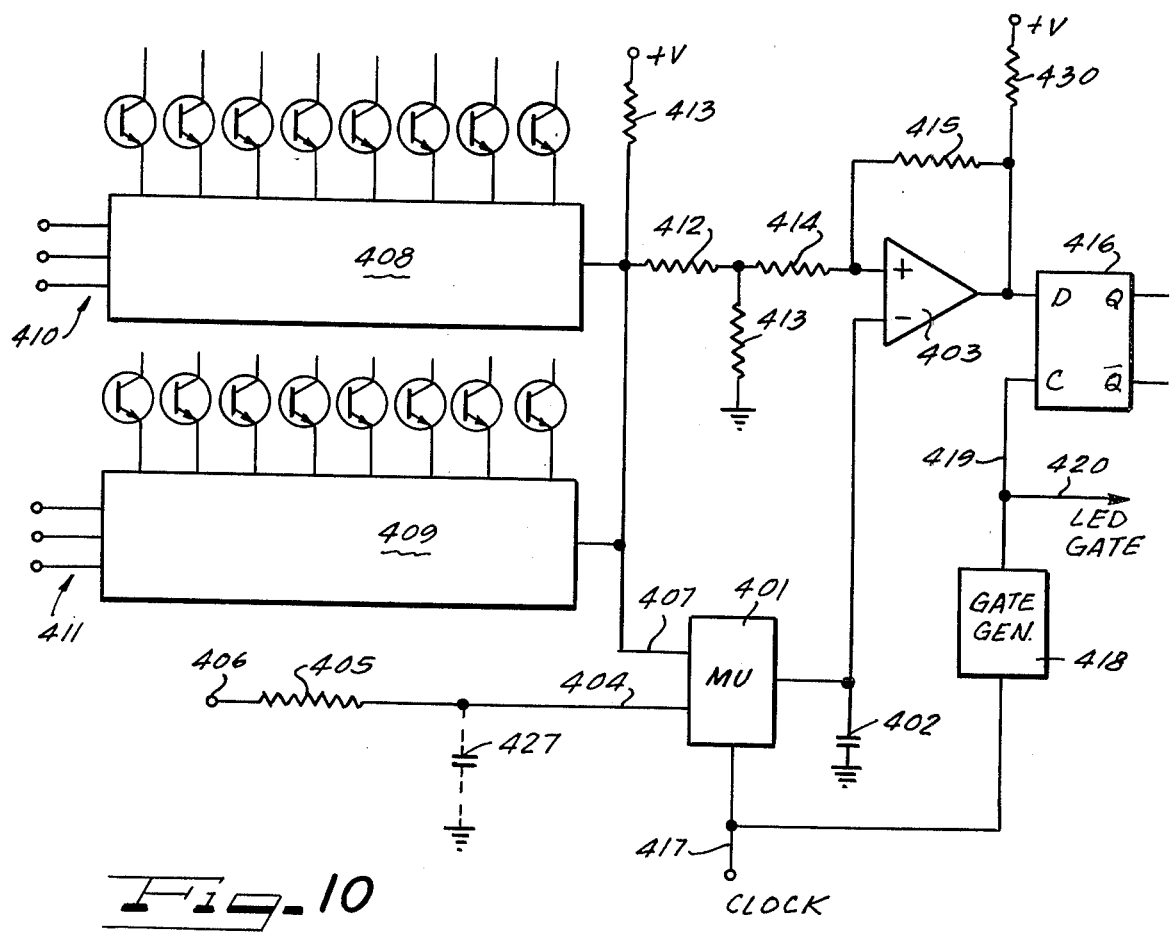
FIGS. 10 and 12 are schematic diagrams of further embodiments of the present invention.
Figure 12:
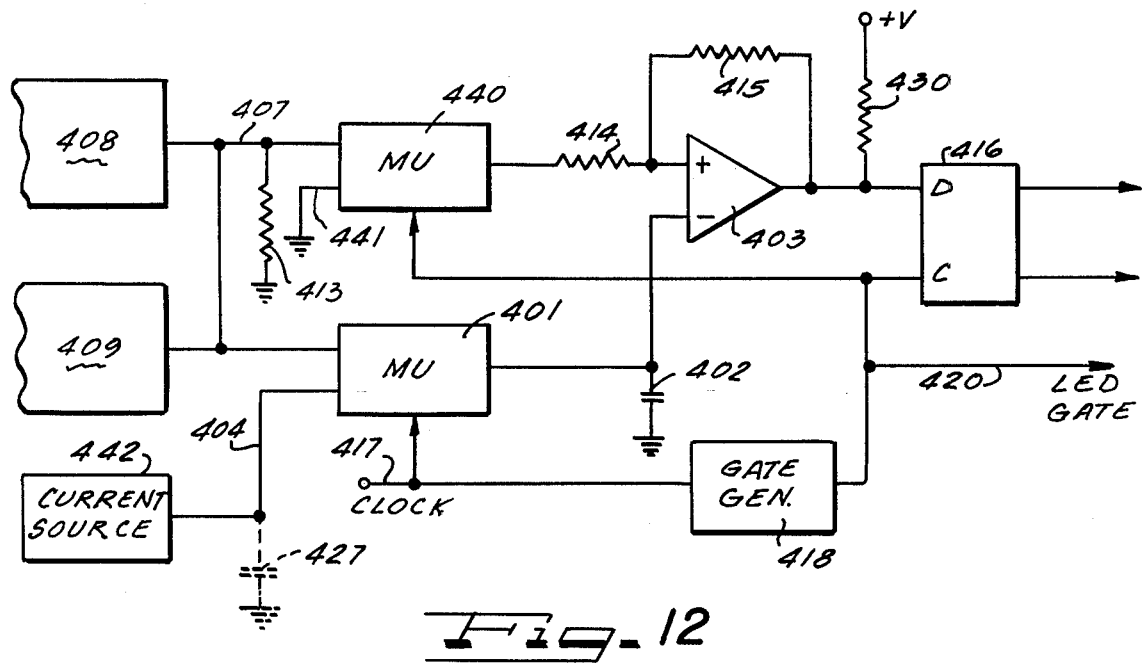

If desired, the resistor 90 can be replaced with an amplifier having a gain exceeding 1, to introduce an additional offset in the signal provided to the inverting input of the comparator 86. Such an amplifier is represented by the dashed box 91. The specific circuit for such an amplifier is not critical, the only requirement being that its output must be greater than its input by either a fixed difference, or by a fixed ratio. Alternative ways of obtaining such an additional offset are shown in FIGS. 7, 10 and 12, described hereinafter.

It is also in some cases desirable to establish a hysteresis for the operation of the comparator 86, by providing a feedback circuit through a series connected resistor 220. The circuit is connected between the output of the comparator 86 and its noninverting input, to represent a positive feedback, so that the operation of the comparator is rendered less sensitive to noise.

An alternative embodiment of the present invention is illustrated in FIG. 7. In this embodiment, a phototransistor 19 is connected through a resistor 300 to the noninverting input of a comparator 301, and the phototransistor is also connected to ground through resistor 302 and a capacitor 303 connected in series. A load resistor 304 is provided for the phototransistor, connected between its emitter and ground, and a bias resistor 305 is connected between the inverting input of the comparator 301 and a source of positive potential at a terminal 306. In the arrangement of FIG. 7, the output of the phototransistor 19 is continuously applied to the integrating circuit comprising the resistor 302 and the capacitor 303, so that the voltage across the capacitor 303 forms a weighted time interval of the output of the phototransistor 19, with greater weight being given to the most recent output levels. Accordingly, the potential applied to the inverting input of the comparator 301 corresponds generally to the ambient light level sensed by the phototransistor 19, while the potential applied to the noninverting input of the comparator 301 corresponds to the instantaneous light level being sensed by the phototransistor 19. In FIG. 8, the curve 310 illustrates the voltage across the capacitor 303, when the signal represented by the line 50 appears at the output of the phototransistor 19. FIG. 9 illustrates the difference between the signals represented by the curves 50 and 310 of FIG. 8, where it can be seen that the effect of the varying ambient light conditions is considerably reduced, so that a fixed threshold level can be selected while maintaining proper operation. The threshold level is selected by proper choice of the resistor 305, in relation to the resistors 302 and 304.

The apparatus of FIG. 7, has the disadvantage of requiring a separate comparator 301 for each phototransistor 19 or for each group of phototransistors 19 in the case where outputs of a group of phototransistors are connected together in common. In installation requiring large numbers of phototransistors (or large numbers of groups of phototransistors when groups are interconnected), the necessary replication of the apparatus of FIG. 7 may cause the apparatus to be considerably more complex than the apparatus illustrated in FIG. 1, which can be adapted to handle any number of phototransistors simply by providing additional multiplexers 60.

It may be desirable, in some cases, to use the apparatus of FIG. 1 which phototransistors which are connected together in groups, with each group being connected to a single input of the multiplexer 60. The select lines 63 are then caused to select the line corresponding to a given group during select intervals in which any member of the group is scheduled to receive a beamed light pulse. This results in a reduced parts count for the apparatus of FIG. 1, since fewer input lines to the multiplexer 60 are required. This is illustrated in FIG. 1 by additional phototransistors 19' shown connected in parallel with the phototransistor 19 by dashed lines.

In a preferred embodiment of the present invention, the multiplexer 60 is a CD4051, the four bit counters 62 and 151 are each 74161 integrated circuits, the switches 80 and 81 are two halves of a CD4016, the flip-flops 101 and 190 are formed by a 74106 integrated circuit, and the comparator 86 is an LM 339.

Referring now to FIG. 10, an alternative embodiment of the present invention is illustrated. A multiplexer 401 is provided which has two inputs, one of which is connected at any given time to a capacitor 402. The multiplexer 401 and the capacitor 402 function as a sample and hold circuit, the output of which is presented to the inverting input of an operational amplifier 403, functioning as a comparator. The first input 404 of the multiplexer 401 is connected through a resistor 405 to a source of positive potential at a terminal 406. The other input 407 is connected in common to the outputs of a plurality of multiplexer units, two of which, namely, multiplexers 408 and 409, are shown in FIG. 10. Other multiplexers may also be provided as outputs or connected in common to the line 407. Each of the multiplexers 408 and 409 are connected to a plurality of phototransistors, eight in the example illustrated in FIG. 10. One of the phototransistors connected to the multiplexer 408 is selected by suitable potentials supplied to the select terminals 410, in binary code, as is conventional. The same coded potentials are supplied to the select terminals 411 of the multiplexer 409, as well as other multiplexers, if any. Accordingly, one phototransistor is connected through each multiplexer to the line 407, so that the potential on line 407 is determined by the combined conductivities of all of the phototransistors which are selected by all of the multiplexers. The phototransistors are supplied with a suitable source of electric power by conventional means (not shown). The line 407 is connected through a resistor 431 to a source of positive potential, and through resistors 412 and 413 to ground; and the junction of the resistors 412 and 413 is connected through resistor 414 to the noninverting input of the comparator 403. The resistor 431 insures that a small biasing current always flows through resistors 412 and 413. A resistor 415 supplies positive feedback to the noninverting input, and the output of the comparator 403 is connected to the D-input of a flip-flop 416 and to a source of positive voltage through a pull-up resistor 430. One or the other of the inputs 404 and 407 are selected by a clock signal on a line 417. The clock signal is supplied to a unit 418 which generates an LED gate pulse, which is supplied to the clock input of the flip-flop 416 over a line 419. The LED gate is also supplied to the LED's or other light sources over a line 420, so that an LED or other light source is energized for the period of the LED gate pulse. Typically, one light source is selected (by means not shown) and this selects the light source as energized for the period of the LED gate pulse.

Figure 11:
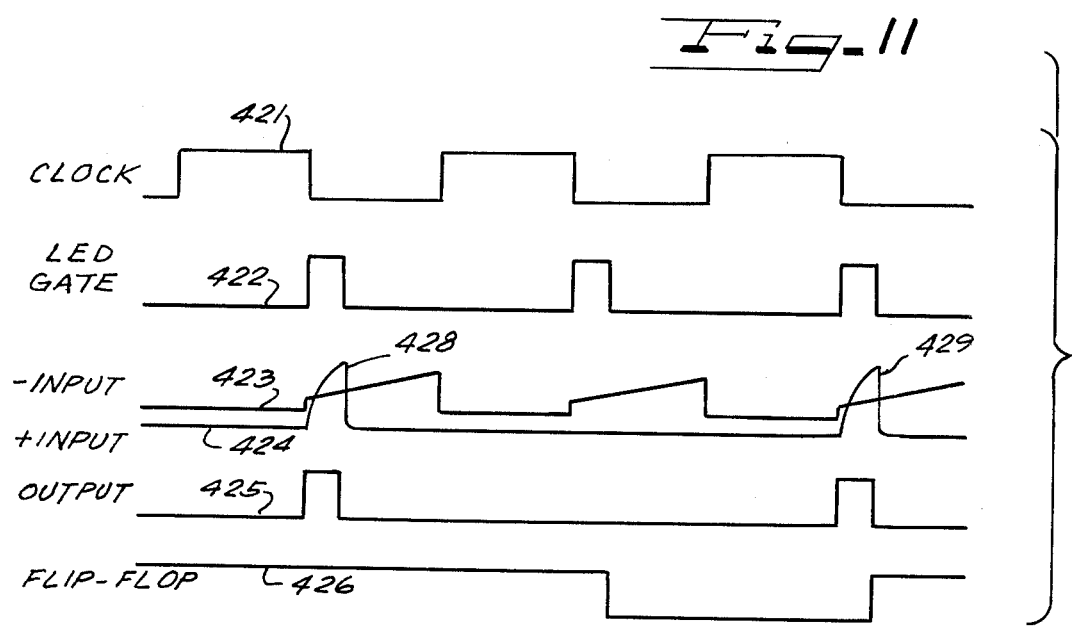
FIGS. 11 and 13 illustrate waveforms produced in the course of operation of the apparatus of FIGS. 10 and 12, respectively.

The operation of the apparatus of FIG. 10 can be best understood by a review of the waveforms illustrated in FIG. 11. The clock signals are indicated as 421 and the LED gate pulse is indicated at 422.

The binary coded potentials applied to the terminals 410 and 411 change in sequence with the rising edge of the clock waveform 421, so that a given group of phototransistors is selected for a period of the clock waveform defined between two successive positive going edges. During the first half-cycle of this waveform, the multiplexer 401 is caused to select the input 407, so that the capacitor 402 is quickly charged to a level which is the average of the ambient illumination sensed by all of the phototransistors which are selected during that cycle. The wave-form 423 illustrates the voltage across the capacitor 402 which is also the input to the inverting input of the comparator 403. By the end of the first half-cycle of the clock waveform 421, the capacitor 402 has been charged to the voltage dependent upon the ambient illumination, and this voltage is also present at the inverting input of the comparator 403. Since this voltage exceeds the voltage supplied to the noninverting input during this period, the output of the comparator 403 is low, as illustrated by waveform 425.

The voltage supplied to the noninverting input of the comparator 403 is also derived from the line 407, but is less an amplitude because of the voltage divider formed by resistors 412 and 413.

At the falling edge of the clock waveform 421, the multiplexer 401 is caused to select the other input terminal 404. The selection of input 404 causes the voltage on the capacitor 402 to rise sharply by a small amount, as a result of an increase in the charge on the capacitor 402, resulting from the capacitor 427 when the input line 404 is selected. Following the small but sharp increase in the voltage level of the capacitor 402, the voltage across the capacitor 402 rises linearly as its charge is increased by a current flowing through the resistor 405. Both the step increase in voltage, and the rising voltage across the capacitor 402 during the negative going half-cycle of the clock waveform tend to maintain the inverting input of the comparator 403 relatively high, to increase the immunity to any noise pulses which may be presented to the noninverting input.

During the LED gate pulse, when one the LED's is fired and light from this LED is sensed, a pulse 428 is produced, which is connected through the resistors 412 and 414 to the noninverting input of the comparator 403.

When the pulse 428 is produced, the noninverting input of the comparator 403 exceeds the inverting input, causing the comparator output to go high, as shown in the waveform 425. The positive feedback through the resistor 415 increases the level at the noninverting input, and helps to keep the output of the comparator 403 high throughout the period of the pulse 428, and improves the noise immunity of the system. At the end of the LED gate pulse, the pulse 428 quickly decays to the ambient value, causing the noninverting input level to fall below the inverting input level, and bringing the output of the comparator 403 low.

The flip-flop 416 is clocked by the LED gate pulse, and is caused to store the state of the output of the comparator 403 at the trailing edge of the LED gate pulse. Since this time is within the period of the pulse 428, the flip-flop 416 is set to cause its Q output to go high, or remain high if it were high already.

As illustrated in FIG. 11, two pulses 428 and 429, are produced on the line 407, with no pulse produced between them. This corresponds to the beam being blocked from all of the phototransistors which are selected at any given time, so that the output of the comparator 403 remains low. Since this output is low at the trailing edge of the LED gate, the flip-flop 416 is caused to change its state that time, bringing its Q output low as shown in waveform 426. The presence of a low-level from the Q output of the flip-flop 416 indicates that a broken beam has been detected, which corresponds in its location to the LED or light source which is energized during the clock pulse cycle in which the waveform 426 goes low.

It will be appreciated that while the variable threshold systems described above are especially suitable for use with touch panels and the like incorporating phototransistors or photosensitive devices, it is apparent that the advantages of the present invention may be made use of whenever a photosensitive process is to be made immune to ambient light conditions. This applies to a host of applications, having in common only the fact that intensity of the light source is monitored periodically.

FIG. 12 shows an alternative form of the present invention, similar to that of FIG. 10. In FIG. 12, an analog switch 440 is employed as a multiplexer to connect the line 407 to the comparator 403 only during the period of the LED gate pulse. At other times, the noninverting input of the comparator 403 is connected to the second input 141 of the multiplexer, which is grounded. This insures that the output of the comparator 403 is in its low state at the beginning of the LED gate pulse. Another difference is the current source 442, which replaces the voltage source and resistor 405 and 406 of FIG. 10. The current source allows the capacitor 402 to be charged at a constant rate during the period starting with the beginning of the LED gate pulse, so that the waveform at the inverting input of the comparator 403 is independent of the ambient light level. In other respects, the circuit of FIG. 12 is like the circuit of FIG. 10.

Figure 13:
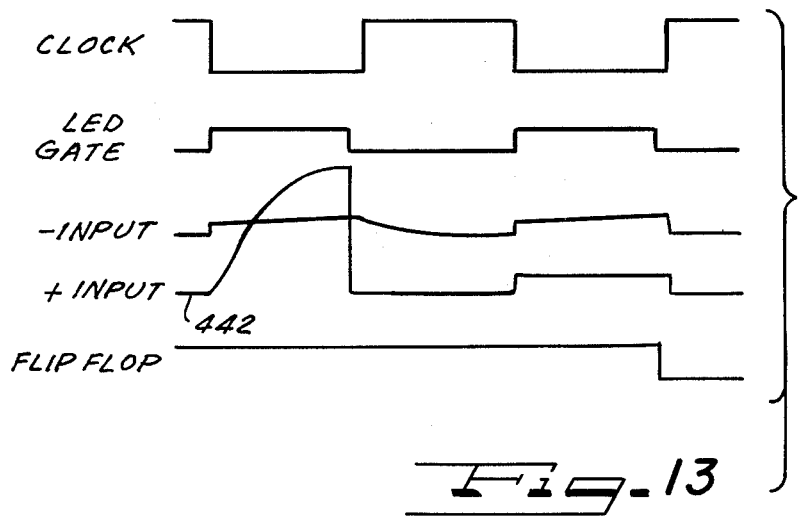

FIG. 13 shows waveforms which are produced during operation of FIG. 12. The waveforms of FIG. 13 show that the LED gate pulse is nearly as long as a half-cycle of the clock signal, a condition which is encountered when the clock frequency must be relatively high, so that a great number of LED's can be successively energized during each scan cycle. The waveforms also indicate a condition in which the output of the phototransistors is relatively low, as is the case when the phototransistors are spaced far apart from the LED's. The circuit of FIG. 12 operates under those conditions. The waveform 442, for the noninverting input to the comparator, falls to ground potential at the end of the LED gate pulse, and remains at that level until the next LED gate pulse. When the light beam is broken, the potential supplied to the noninverting input rises to a level corresponding to the ambient light level, but the potential supplied to the inverting input is higher because of the step offset caused by the capacitor 427, the positive slope due to the current source 442, and the hysteresis supplied by the resistor 415.

In this way a missing pulse from a phototransistor is detected with great certainty and with a large noise immunity.

In the foregoing, the present invention has been described with such particularity to enable others skilled in the art to make and use the same, without departing from the essential features of novelty of the present invention, which are intended to be defined and secured by the appended claims.

What is claimed is:

1. In a touch input device having a panel and means for defining a plurality of beams of radiant energy arranged parallel to the panel, each of said beams being defined by an energy emitter and an energy detector, the improvement comprising sampling means for sampling the ambient output level of one of said detectors immediately prior to the energization of its associated emitter, storage means for temporarily storing a signal representative of said ambient output level, and comparator means for comparing the instantaneous output of said detector with said stored signal during a subsequent interval while said emitter is energized for deriving a signal manifesting the interruption or noninterruption of said beam.

2. Apparatus according to claim 1 including multiplexer means having a plurality of inputs connected with a plurality of said detectors, and means for causing said multiplexer means to select said inputs in timed sequence.

3. Apparatus according to claim 2, wherein said storage means comprises a sample-and-hold device for sampling and manifesting the ambient output level of a detector connected to a selected input prior to energization of the emitter associated with said detector.

4. Apparatus according to claim 3, including a first switch connected between the output of said multiplexer and the input of said sample-and-hold device, a second switch connected between the output of said multiplexer and the input of said comparator, means for energizing said first switch during a first time interval prior to energization of an emitter associated with any detector connected to a selected input of said multiplexer, and means for actuating said second switch during the energization of an emitter associated with a detector connected to said selected input.

5. Apparatus according to claim 3, including amplifier means connected between said sample-and-hold device and said comparator for supplying to said comparator a signal which differs from that manifested by said sample-and-hold device by a predetermined ratio.

6. Apparatus according to claim 3, including amplifier means connected between said sample-and-hold device and said comparator for supplying to said comparator a signal which differs from that manifested by said sample-and-hold device by a predetermined difference.

7. Apparatus according to claim 3, including positive feedback means connected with said comparator, for introducing hysteresis into the operation of said comparator.

8. Apparatus according to claim 3, including impedance means connected between said multiplexer and said comparator.

9. Apparatus according to claim 1 including discharge means for discharging a detector to a predetermined reference voltage immediately prior to operation of said sampling means.

10. Apparatus according to claim 9 wherein said discharge device comprises a transistor connected between the output of said detector and a reference potential.

11. In a touch panel having a plurality of pulsed beams of radiant energy traversing the space parallel and adjacent to said touch panel, each beam being defined by an emitter and a detector, the improvement comprising a plurality of comparators, one for each of a set of said detectors, and a plurality of RC networks, one for each of said sets, each of said comparators having one input connected to the output of said set, and another input connected to the output of said RC network, said RC network developing a time weighted integral of the output of its respective set, whereby the output of the comparator manifests the relative level of the output produced by said set in relation to the time weighted integral of said output, and means for sequentially sampling each of said comparators during pulsing of a beam associated therewith.

12. Apparatus according to claim 11 wherein each said set contains one detector.

13. Apparatus according to claim 11 including bias means connected with said RC network for establishing a threshold of operation of said comparator.

14. For use with a sensing device for periodically sensing the intensity of a radiant beam, apparatus for compensating for the ambient radiation level comprising means for sensing the ambient radiation level immediately before said intensity sensing, means for developing an electrical representation of said ambient radiation level, storage means for storing said representation, and comparing means operative during said intensity sensing for comparing said stored representation with an electrical representation of said intensity.

15. Apparatus according to claim 14, wherein said storage means is a capacitor.

16. Apparatus according to claim 14, wherein said storage means comprises a sample and hold device, said sample and hold device being effective to sample said ambient level immediately before said intensity sensing and to hold a representation of said level during said intensity sensing.

17. Apparatus according to claim 16, including a storage device connected to said comparing means for storing a representation of the output of said comparing means following said intensity sensing.

18. Apparatus according to claim 17 wherein said storage device is an edge triggered flip-flop, triggered at the end of said intensity sensing.

19. Apparatus according to claim 14, wherein said storage device includes a multiplexer for sampling two inputs and a capacitor connected to the output of the multiplexer, means for connecting a first of said inputs to said ambient sensing means, means for connecting the second input to a current supply, and means for causing said multiplexer to connect said first input to said capacitor immediately before said intensity sensing and to connect said second input to said capacitor during said intensity sensing.

20. Apparatus according to claim 19, including an effective capacitance at said second input, whereby the voltage across said capacitor is sharply raised when said second input is connected to said capacitor.

21. Apparatus according to claim 19, including means connected between said ambient sensing means and said comparing means for presenting to said comparing means a reduced representation of said intensity.

22. In a touch input device having a panel and means for defining a plurality of beams of radiant energy arranged parallel to the panel, each of said beams being defined by an energy emitter and an energy detector, the combination comprising means for pulsing said energy emitters sequentially, for causing the energy detectors associated with said energy emitters to produce responsive signals during such pulses, sampling means for sampling the ambient output levels of each of said detectors, immediately prior to the energization of its associated energy emitter, storage means for temporarily storing signals representative of said ambient output levels, said comparator means for comparing the instantaneous output of each of said detectors during said pulses with the stored signal representative of the ambient output level of such detector subsequent to the previous said pulse, said comparator producing a signal in response to said comparison manifesting the interruption or non-interruption of each of said plurality of beams.

* * * * *